(12) United States Patent
Santos

(10) Patent No.: US 7,970,669 B1
(45) Date of Patent: Jun. 28, 2011

(54) METHOD AND SYSTEM FOR STORE-TO-CONSUMER TRANSACTION MANAGEMENT

(75) Inventor: Todd Santos, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 229 days.

(21) Appl. No.: 12/179,747

(22) Filed: Jul. 25, 2008

(51) Int. Cl.
*G07B 17/00* (2006.01)

(52) U.S. Cl. ............... 705/30; 705/28; 705/34; 705/39; 705/41; 235/380; 235/379; 235/383

(58) Field of Classification Search ............ 705/28, 705/39, 26, 40–41; 235/379
See application file for complete search history.

(56) References Cited

U.S. PATENT DOCUMENTS

| | | | |
|---|---|---|---|
| 6,662,020 B1 * | 12/2003 | Aaro et al. ............... | 455/552.1 |
| 7,100,821 B2 * | 9/2006 | Rasti ....................... | 235/380 |
| 7,240,028 B1 * | 7/2007 | Rugge ...................... | 705/30 |
| 7,689,508 B2 * | 3/2010 | Davis et al. ............... | 705/39 |
| 2004/0078332 A1 * | 4/2004 | Ferguson et al. .......... | 705/41 |
| 2004/0236647 A1 * | 11/2004 | Acharya .................... | 705/30 |
| 2005/0097046 A1 * | 5/2005 | Singfield .................... | 705/42 |
| 2010/0017325 A1 * | 1/2010 | Scherpa et al. ............ | 705/39 |

* cited by examiner

*Primary Examiner* — Vanel Frenel
(74) *Attorney, Agent, or Firm* — Osha • Liang LLP

(57) ABSTRACT

The invention provides a method for capturing, tracking and managing a transaction of a user at an advanced Point-of-Sale (POS) register. The method steps include obtaining transaction data of the transaction from the POS register using a mobile device and managing POS-based expenditures of the user using the transaction data including a transaction amount, a payment type of the transaction, and relevant bank or credit card account information for the method of payment used by the user. Managing POS-based expenditures may include generating a real-time balance of the account based on the transaction data and presenting the real-time balance of the account to the mobile device.

31 Claims, 6 Drawing Sheets

METHOD AND SYSTEM FOR STORE-TO-CONSUMER TRANSACTION MANAGEMENT

BACKGROUND

Finance planning is related to the application of financial principles to monetary decisions of a consumer (e.g., an individual or a family unit) or a small business. Finance planning takes into account financial risks, goals, and future events in determining how the consumer or small business obtains, budgets, saves, and spends financial resources. Components of finance planning may include the monitoring and management of personal or business accounts established at financial institutions (FIs) such as bank accounts, investment accounts, retirement accounts, credit cards, consumer loans, business loans, and the like, but also other types of accounts like social security benefits, insurance policies, income tax-related accounts (like estimated tax payments), lines of credit, heath care savings accounts, micro-loans and person-to-personal loans, stored value cards, gift cards and, of course, cash.

Financial planning and budgeting may be performed with the help of accounting and/or financial planning software. For example, a user (i.e., a consumer or a person representing a business) may enter income, expenses, liabilities, and assets into an accounting program. The program may then query the user for a set of financial goals, as well as make recommendations regarding the user's choice of financial goals. The program may also generate one or more plans or budgets that enable the user to reach certain financial goals. Once the user has selected a plan, the program may also monitor the progress in carrying out the plan. For example, the program may analyze spending and provide automated alerts when spending exceeds the budget in a particular area and/or a particular time period. The automated alerts may be provided within the program or via email, short message service (SMS), or other messaging system. The program may further reassess the user's financial situation, progress, goals, and plan(s) over time and in light of events that financially impact the user.

To track the financial progress, the accounting and/or financial planning software may have online capability to download or otherwise obtain the financial information (i.e., FI-originated download data) from one or more financial institutions. The financial information may include account types, account balances, and/or any financial transactions associated with the respective accounts. Because the financial transactions are: (a) sometimes stored in a proprietary format by the financial institution; (b) usually only include partial information about a transaction; and (c) frequently take days to be processed and reflected within the FI's and its enabling partners' systems, the financial transactions may be difficult to obtain, understand and/or categorize, or the information may be delayed by several days. Consequently, the financial situation and/or budget progress of the consumer may be better assessed by processing financial transaction data by other means and/or obtaining additional information regarding the financial transactions themselves. Examples of accounting and/or financial planning software include financial management software, accounting software, tax software, healthcare software, insurance software, etc.

Techniques have been developed to track expenditures for financial planning purposes. For example, many financial institutions now routinely provide transaction information and statements, on paper or using paperless means (e.g., based on the open financial exchange specification or OFX), relating to transactions consummated using financial instruments (e.g., credit cards) issued to a user by the financial institution. In addition, techniques have also been developed for recognizing and categorizing transactions once certain data contained in a particular transaction record (e.g., payee name) is received by financial software.

Despite the development and advancement of various aspects of transaction tracking for financial planning, real-time feedback mechanisms regarding account balances and budget progress are not available to consumers and small businesses due to the lack of item-level details about a transaction (e.g., what exactly was purchased) and due to delays in processing transaction data by financial institutions. Furthermore, there exists no easy way to track and categorize cash transactions such as purchases made at a Point-of-Sale (POS) cash register using cash or cash equivalents.

SUMMARY

In general, in one aspect, the invention relates to a method for capturing and tracking a transaction of a user at an advanced Point-of-Sale (POS) register. The method steps include obtaining transaction data of the transaction from the POS register using a mobile device and managing POS-based expenditures of the user using the transaction data. The transaction data includes a transaction amount and a payment type associated with an account of the transaction. Managing POS-based expenditures may include generating a real-time balance of the account based on combining the transaction data with FI data in order to present the real-time balance of the account to the mobile device of the user.

In general, in one aspect, the invention relates to a method for capturing and tracking a transaction of a user at an advanced Point-of-Sale (POS) register. The method steps include generating transaction data of the transaction based on at least inputs from an operator of the POS register and transmitting the transaction data for receiving by a mobile device of the user for managing POS-based expenditures. The transaction data includes a transaction amount and a payment type associated with an account of the transaction. Managing POS-based expenditures may include generating a real-time balance of the account based on combining the transaction data with FI data in order to present the real-time balance of the account to the mobile device of the user.

In general, in one aspect, the invention relates to a computer readable medium, comprising computer program code embodied therein for capturing and tracking a transaction of a user at an advanced Point-of-Sale (POS) register, the computer program code comprising instructions that, when executed, are configured to obtain transaction data of the transaction from the POS register using a mobile device and manage POS-based expenditures of the user using the transaction data. The transaction data includes a transaction amount and a payment type associated with an account of the transaction. Managing POS-based expenditures may include generating a real-time balance of the account based on combining the transaction data with FI data in order to present the real-time balance of the account to the mobile device of the user.

In general, in one aspect, the invention relates to a computer readable medium, comprising computer program code embodied therein for capturing and tracking a transaction of a user at an advanced Point-of-Sale (POS) register, the computer program code comprising instructions that, when executed, are configured to generate transaction data of the transaction based on at least inputs from an operator of the POS register and transmit the transaction data for receiving by a mobile device of the user for managing POS-based expenditures. The transaction data includes a transaction amount and a payment type associated with an account of the transaction. Managing POS-based expenditures may include generating a real-time balance of the account based on combining the transaction data with FI data in order to present the real-time balance of the account to the mobile device of the user.

In general, in one aspect, the invention relates to a Point-of-Sale (POS) transaction tracking system. The system includes an advanced POS register having transaction data and a POS transmitter, the transaction data relating to a transaction of a user, the POS transmitter configured to transmit the transaction data within a pre-determined range of the advanced POS register and a mobile device of the user for obtaining the transaction data and managing POS-based expenditures of the user using the transaction data. The transaction data includes a transaction amount and a payment type associated with an account of the transaction. Managing POS-based expenditures may include generating a real-time balance of the account based on combining the transaction data with FI data in order to present the real-time balance of the account to the mobile device of the user.

Other aspects of the invention will be apparent from the following description and the appended claims.

DETAILED DESCRIPTION

Figure 1A:
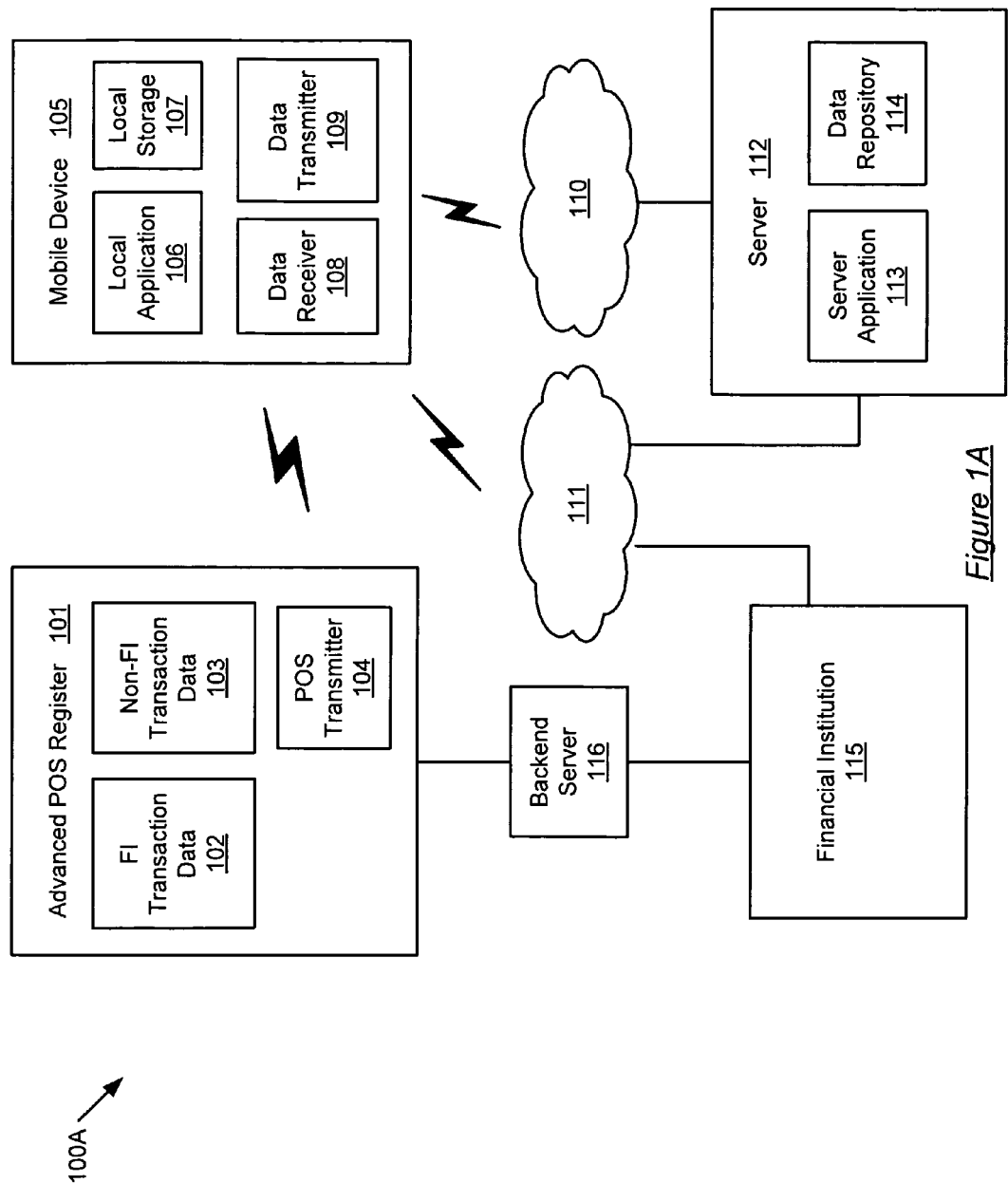
FIGS. 1A and 1B show exemplary systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for capturing and tracking Point-of-Sale (POS) transactions by a user from a store. More specifically, embodiments of the invention relate to broadcasting POS transaction data from an advanced POS register and obtaining POS transaction data using a mobile device, where expenditures relating to the POS transaction can be captured, categorized, and tracked. In one or more embodiments of the invention, POS transactions may be captured and tracked in real-time. In one or more embodiments of the invention, printing the paper POS receipts at the POS register is replaced by transmitting the POS transaction data to a mobile device of a transacting user at the POS register. The terms "POS transaction data" and "transaction data", "POS receipt" and "receipt", "transacting user" and "user" are used interchangeably in this document.

FIG. 1A shows a Point-of-Sale (POS) transaction tracking system (100A) in accordance with one or more embodiments of the invention. Specifically, the system (100A) includes an advanced POS register (101), a backend server (116), a mobile device (105), networks (110) and (111), a server (112), and a financial institution (115). Each of the aforementioned components of FIG. 1A is described in detail below.

In one or more embodiments of the invention, the advanced POS register (101) transmits POS transaction data to the mobile device (105) of a user (not shown) who is engaging in the POS transaction. In one or more embodiments of the invention, the data transmission may be based on electronic signal, magnetic signal, electromagnetic signal, optical signal (e.g., a barcode display), sonic or ultrasonic signal (e.g., acoustic coupling or DTMF signal), or other signal suitable for transmitting data. In one or more embodiments of the invention, the transaction data obtained from the advanced POS register (101) by the mobile device (105) may include a numeric value including the transaction amount and information regarding types of payment involved such that a local application (106) may be installed in the mobile device (105) for recognizing, tracking or otherwise managing user expenditures by type or account (e.g., paid by using cash at the advanced POS register (101)) relating to the POS transaction data. In one or more embodiments of the invention, the advanced POS register (101) and the mobile device (105) may be stand-alone devices without the need to be connected to any other components of FIG. 1A, in which case the other components may not be necessary components of the system shown in FIG. 1A. In one or more embodiments of the invention, the advanced POS register (101) may be a stationery device at a retailer checkout stand or a mobile device carried by a mobile checkout worker of the retailer.

In one or more embodiments of the invention, the advanced POS register (101), the mobile device (105), or combination thereof is configured to provide confirmation (e.g., using visual, audio, vibratory, or other sensory signal) of the transaction data being obtained by the mobile device. In one or more embodiments of the invention, the mobile device (105) may display the obtained transaction data for user acceptance (e.g., approval to be stored, accepted into an account register, relayed, or otherwise further transmitted).

In one or more embodiments of the invention, the mobile device (105) is communicatively coupled to a server (112) via a network (110) where the server (112) includes server application (113) for tracking or otherwise managing user expenditures relating to the POS transaction data. The mobile device (105) is configured with data transceiver (109) for transmitting the transaction data to or otherwise communicating with server (112) via the network (110). In such embodiments, the local application (106) may be a data collection agent, a front-end user interface, or a client of the server application (113). In one or more embodiments of the invention, the server application (113) may be tax software, healthcare software, insurance claims software, payroll software, accounting software, loan or line-of-credit software, personal finance tracking software, or other suitable financial management software. In one or more embodiments of the invention, the server (112) may be a personal computer, a notebook computer, a web server, a group of networked servers, a virtualized server environment, or other suitable mobile or stationary computing devices. Furthermore, the server (112) may be owned by the user or operated by a third party service provider. In one or more embodiments of the invention, the network (110) may be a public wide area network, a private network operated by the third party service provider, or a portion of the Internet.

In one or more embodiments of the invention, the advanced POS register (101) is coupled to a backend server (116) to form a portion of a merchant POS system (not shown). The POS transaction may be paid by using a financial instrument (e.g., a credit card) issued to the user by a financial institution (115). In such embodiments, the advanced POS register (101), in conjunction with the backend server (116) transmits the transaction data (102) relating to the POS transaction to the financial institution (115). Furthermore, FI-originated download data may be obtained via the server (112) or the mobile device (105) from the financial institution (115) using capability (such as OFX) established based on agreement between the FI and the server application provider. For example, FI-originated download data may be downloaded to the server (112) or the mobile device (105) via a network (111), which may be a public wide area network, a private network operated by the financial institution, or a portion of the Internet. In one or more embodiments of the invention, the user receives FI-originated download data from the financial institution (115) for reconciling with the transaction data obtained directly from the advanced POS register (101) and captured on the mobile device (105).

In one or more embodiments of the invention, the advanced POS register (101) processes, includes and transmits transaction data such as Financial Institution (FI) transaction data (102) and/or non-FI transaction data (103)). The transaction data relates to a transaction of a user (not shown) consummated at the advanced POS register (101) operated by a merchant (not shown). FI transaction data (102) relates to transactions paid using a financial instrument (not shown) issued to the user by a financial institution (115). Examples of the financial instrument include credit card, debit card, personal check, business check, or other suitable financial instruments. Non-FI transaction data (103) relates to transactions paid by cash or cash equivalent such as prepaid card, gift card, store credit, food stamp, cashier check, money order, traveler's check, or other cash equivalent. One or more embodiments of the physical form and additional functionality provided by the transaction data are described in further detail in FIG. 2.

In one or more embodiments of the invention, the advanced POS register (101) includes a POS transmitter (104) configured to transmit the transaction data wirelessly within a pre-determined range of the advanced POS register (101). The pre-determined range is determined, for example to include the user's position while paying for the transaction at the advanced POS register (101) such that the mobile device (105) carried by the user may obtain the transaction data via a wireless connection. The pre-determined range is determined preferably to exclude other persons standing in line or roaming about the advanced POS register (101). Examples of protocols used by the POS transmitter (104) include SMS protocol, Bluetooth protocol, consumer IR (infrared) protocol, wireless local area network protocol, or other suitable standard or proprietary wireless data transmission protocols.

In one or more embodiments of the invention, the POS transmitter (104) is configured to transmit the transaction data using a wired connection (e.g., via a physical connector), contact connection (e.g., via a momentary contact), or contactless connection (e.g., via a swiping action). Examples of contact or contactless connection protocols suitable for data transmission include ISO/IEC 14443 proximity card protocol, ISO/IEC 7810 and/or 7816 smart card protocol, iButton® technology one wire protocol (www.maxim-ic.com/products.cfm) of Dallas Semiconductor company, automatic identification and data capture (AIDC) protocol, or other suitable standard or proprietary contact or contactless data transmission protocols.

In one or more embodiments of the invention, the POS transmitter (104) transmits an electronic signal, magnetic signal, electromagnetic signal, optical signal, sonic or ultrasonic signal, or other signal suitable for transmitting data. In one or more embodiments of the invention, the advanced POS register (101) may be configured with multiple data transmitters to transmit the transaction data using various types of signals, connections, and/or protocols so as to support various different types of mobile devices (e.g., the mobile device (105)) having corresponding data receivers.

In one or more embodiments of the invention, the transmission of transaction data is broadcasted unilaterally by the POS transmitter (104), for example as a barcode display or other visual display to be obtained by the mobile device (105) equipped with an optical scanner. In one or more embodiments of the invention, the transmission of transaction data is accomplished cooperatively by the POS transmitter (104) and the mobile device (105), for example using a handshake protocol or a bi-directional communication protocol.

In one or more embodiments of the invention, the transmission of transaction data is automatically initiated (e.g., by an auto-run program on the mobile device (105) and/or the advanced POS register (101)) upon the wireless connection, the wired connection, the contact connection, or the contactless connection being established between the mobile device (105) and the advanced POS register (101). In one or more embodiments of the invention, the transmission of transaction data is initiated by manual activation by the user of the mobile device (105) (e.g., pushing a button on the mobile device that puts the device or the auto-run program into a transaction acceptance mode, then swiping the mobile device (105) over a designated area of the advanced POS register (101), or pushing a button at the checkout stand swipe terminal, etc.) to trigger an action of a data receiver (108) in the mobile device (105) or an operator (a store employee at the checkout stand or the user at a self-checkout POS register) of the advanced POS register (101) (e.g., pushing a button on the advanced POS register (101)) to trigger an action of the data transmitter (104).

In one or more embodiments of the invention, the mobile device (104) is any electronic device having a data receiver (108) capable of receiving data such as the transaction data from the advanced POS register (101). The data receiver (108) may be configured to use wireless connection, wired connection, contact connection, or contactless connection with suitable data transmission protocols to receive the transaction data from the POS transmitter (104). In one or more embodiments of the invention, the mobile device (105) may be configured with multiple data receivers to receive the transaction data using wireless connection, wired connection, contact connection, or contactless connection depending on the type of POS transmitters equipped on different advanced POS registers, or on user preferences.

In one or more embodiments of the invention, the mobile device (105) includes a local application (106) for collecting, recording and displaying POS transaction data and managing related expenditures as well as local storage (107) for storing the transaction data. Examples of mobile device (105) include cellular phone, pager, smart cellular phone, personal digital assistant (PDA), mini-computer, laptop computer, personal global positioning system (GPS), digital camera, personal media player, portable game console, or other suitable handheld mobile devices. The local application (106) and/or the data receiver (108) may be built-in the mobile device (105) or configured separately as an optional hardware add-on module or software feature. In one or more embodiments of the invention, the optional hardware module or software feature may be provided to the user by a merchant operating the advanced POS register (101), the financial institution (115), the mobile device manufacturer, the cellular network operator, a software publisher or a third party service provider operating the server (112).

In one or more embodiments of the invention, the local application (106) is configured only for collecting POS transaction data for the server application (113), which performs expenditure management, categorization, and financial planning functionalities. In such embodiments, the mobile device (105) may be a simple data collection device. In addition to the examples of mobile device (105) described above, functionalities of the mobile device (105) (e.g., the local application (106) and the data receiver (108)) in such embodiments may also be integrated with smart personal objects such as pen, pendant, key fob, key ring, key ring attachment, contact smart card, contactless smart card, USB flash drive, ATM card, credit card, debit card, drivers license, telephone calling card, membership card, preferred customer card, electronic benefit transfer card, smart clothing, or other suitable personal object. In one or more embodiments of the invention, the smart personal objects may be provided to the user by a merchant operating the advanced POS register (101), the financial institution (115), the mobile device manufacturer, the cellular network operator, a software publisher or a third party service provider operating the server (112).

As described above, the local application (106) and/or the data receiver (108) may be configured separately as an optional feature or module. In one or more embodiments of the invention, the separately configured optional feature or module is integrated inside the mobile device (105). In one or more embodiments of the invention, the separately configured optional module is a separate device (e.g., mobile device A (105a)) operatively coupled to the mobile device (105) as shown in FIG. 1B, using preferably, a wireless protocol such as short message service protocol, Bluetooth protocol, consumer IR (infrared) protocol, wireless local area network protocol, or other suitable standard or proprietary wireless data transmission protocols.

Figure 1B:
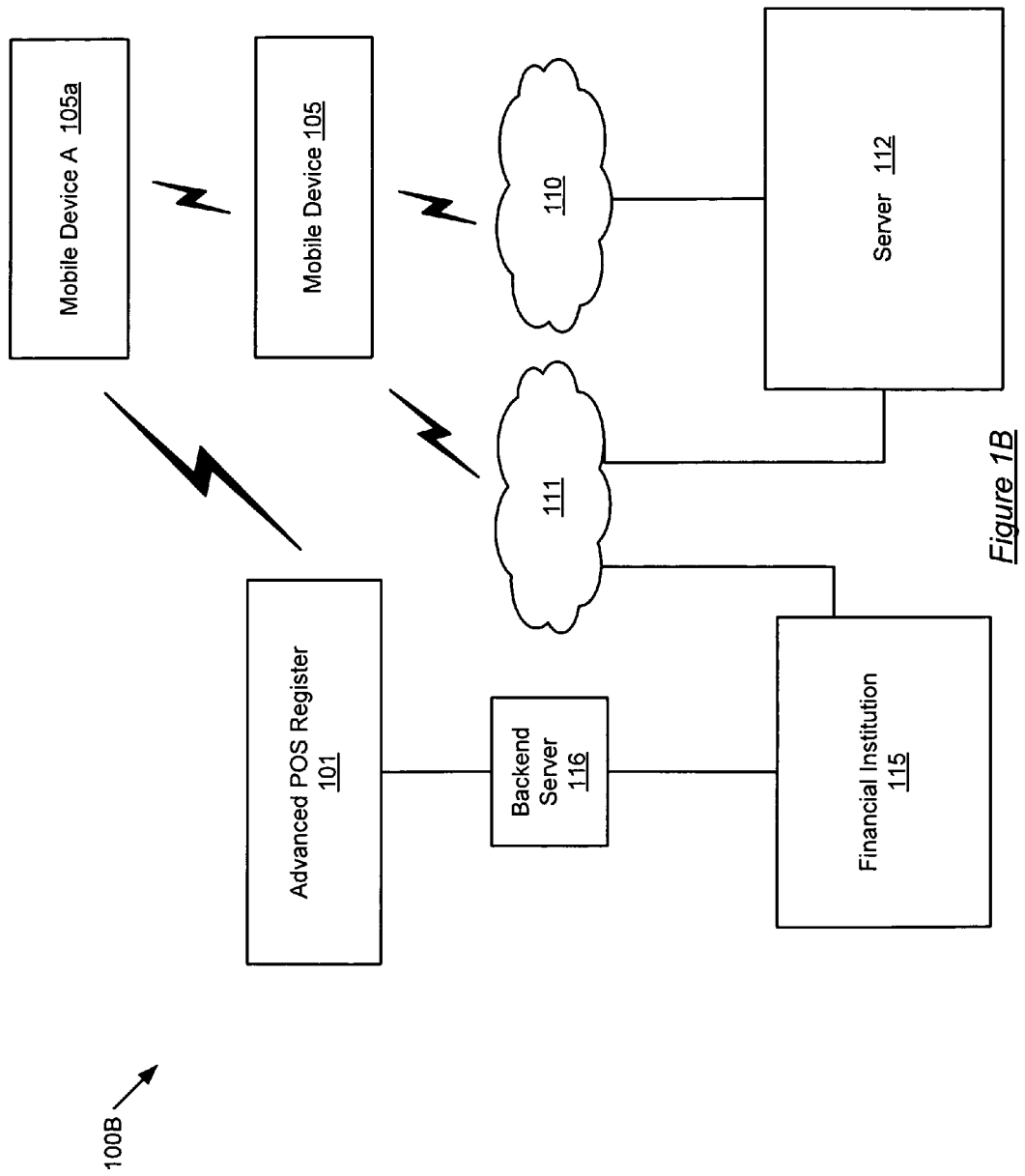

FIG. 1B shows a POS transaction tracking system (100B) in accordance with one or more embodiments of the invention. Various components of system (100B) are essentially the same as those of system (100A) described in FIG. 1A with the exception that functionality of the mobile device (105) in system (100A) is augmented by the mobile device A (105a) as an optional module configured for receiving transaction data from the advanced POS register. In one or more embodiments of the invention, the mobile device (105a) is a simple data collection device substantially smaller in physical scale than the mobile device (105). Examples of the mobile device (105a) include smart personal objects such as pen, pendant, key fob, key ring, key ring attachment, contact smart card, contactless smart card, USB flash drive, ATM card, credit card, debit card, drivers license, telephone calling card, membership card, preferred customer card, electronic benefit transfer card, smart clothing, or other suitable personal object. Examples of the mobile device (105) include cellular phone, smart cellular phone, personal digital assistant (PDA), personal global positioning system (GPS), digital camera, personal media player, portable game console, or any suitable handheld smart device.

In one or more embodiments of the invention, the mobile device (105a) may include an auto-run program (i.e., a sub-component of the local application) that is configured to execute automatically when a triggering event occurs, such as when the mobile device (105a) and the mobile device (105), and/or the advanced POS register, are within a pre-determined range detected by each other. In one or more embodiments of the invention, the functionalities provided by the mobile device (105a) are updateable. Thus, a new version of the local application (106) can be installed on the mobile device (105a). For example, the mobile device (105a) may include a built-in flash memory or accepts a plug-in flash memory module to receive an updated version of the local application (106). In one or more embodiments of the invention, the local application (106) is executed by a processor (not shown) in the mobile device (105a) or the mobile device (105).

Continuing with FIG. 1B, the mobile device (105) provides an input/output platform and a network connection for the transfer of transaction data obtained by the mobile device (105a) to the server (112). The mobile device (105) may be capable of supporting plug-and-play functionality (e.g., automatic, driverless installation of peripheral components such as the mobile device (105a)) and providing a network connection. Further, the network connection may be an Internet connection, a wide area network (WAN) connection, or any other wired or wireless connection to a network such as the network (110) or (111).

In one or more embodiments of the invention, the mobile device (105a) may be provided to the user by a merchant operating the advanced POS register (101), the mobile device manufacturer, the cellular network operator, the financial institution (115), a software publisher or a third party service provider operating the server (112).

Figure 2:
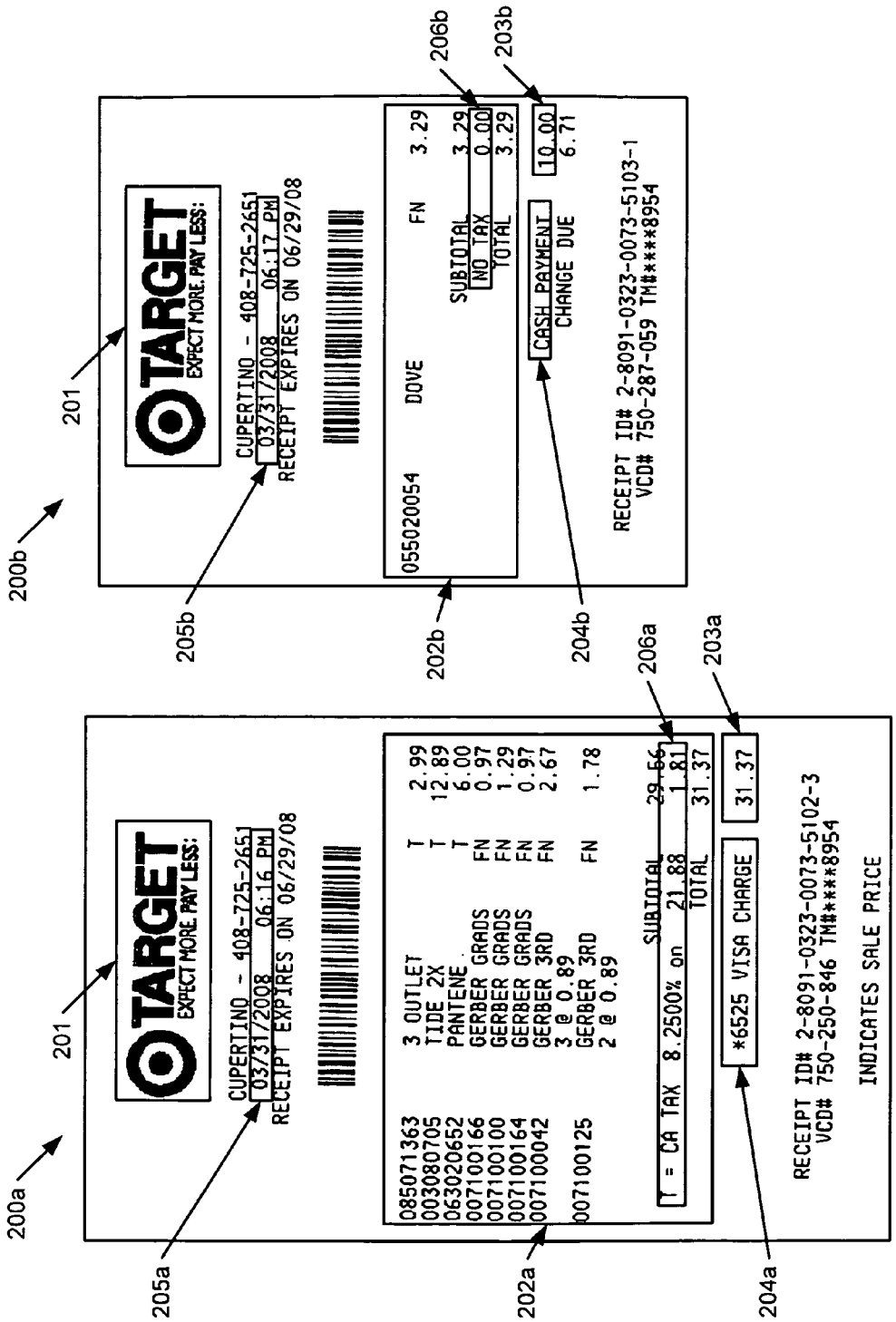
FIG. 2 shows transaction data in accordance with one or more embodiments of the invention.

FIG. 2 shows an example of transaction data printed on paper POS receipts (200a) and (200b) by a POS register, such as the advanced POS register (101) described with respect to FIGS. 1A and 1B above. Here, POS receipts (200a) and (200b) include merchant information (200), itemized purchase and item information (202a) and (202b), total transaction amounts (203a) and (203b), transaction payment types (204a) and (204b), sales tax or other tax information (206a) and (206b), and date and time information (205a) and (205b). In addition, POS receipts may also include credit and/or refund information. As shown in FIG. 2, the transaction payment type (202a) indicates the transaction data of the POS receipt (200a) to be FI transaction data associated with a VISA card issued by a financial institution (e.g., the financial institution (115) of FIGS. 1A and 1B). In addition, the transaction payment type (202b) indicates the transaction data of the POS receipt (200b) to be non-FI transaction data associated with a cash payment. In one or more embodiments of the invention, at least a portion of the transaction data used by the advanced POS register (101) to print the paper POS receipts is transmitted to the mobile device of the user. In one or more embodiments of the invention, printing the paper POS receipts is replaced by transmitting the transaction data to the mobile device of the user. In one or more embodiments of the invention, the transaction data received by the mobile device of the user may also be accompanied by marketing material, electronic coupons, frequent buyer rewards, or future discount offer codes, etc.

Figure 3A:
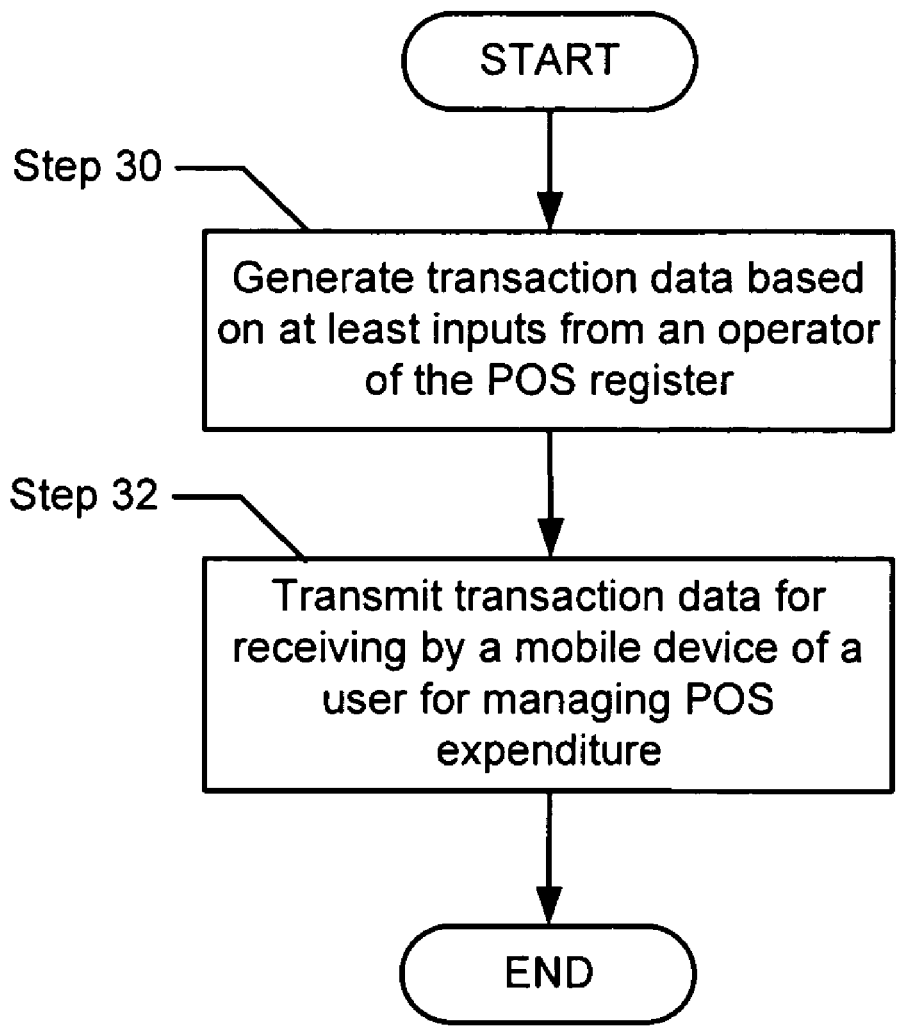
FIGS. 3A and 3B show flow charts of exemplary methods in accordance with one or more embodiments of the invention.

FIG. 3A shows a flow chart of an exemplary method from POS register perspective in accordance with one or more embodiments of the invention. The method may be practiced using, for example, the system described with respect to FIG. 1A or 1B above. In one or more embodiments of the invention, one or more of the steps shown in FIG. 3A may be omitted, repeated, and/or performed in a different order than that shown in FIG. 3A. Accordingly, the specific arrangement of steps shown in FIG. 3B should not be construed as limiting the scope of the invention.

In Step 30, transaction data is generated in an advanced POS register (e.g., the advanced POS register (101) of FIG. 1A or 1B) based on at least inputs from an operator (e.g., a store employee at checkout stand or a user of a self-checkout POS register) of the advanced POS register. The transaction data may include merchant information, itemized purchase and item information, total transaction amount, transaction payment type, tax information, and date and time information as described with respect to FIG. 2 above.

In Step 32, the transaction data is transmitted for receiving by a mobile device of a user paying for the item(s) that are the subject of the transaction. As described with respect to FIGS. 1A and 1B above, the transaction data may be transmitted using various types of signals, connections, and protocols. In one or more embodiments of the invention, the transaction data transmitted by the advanced POS register includes the numeric value of the transaction amount and information regarding the payment type(s) of the transaction.

Figure 3B:
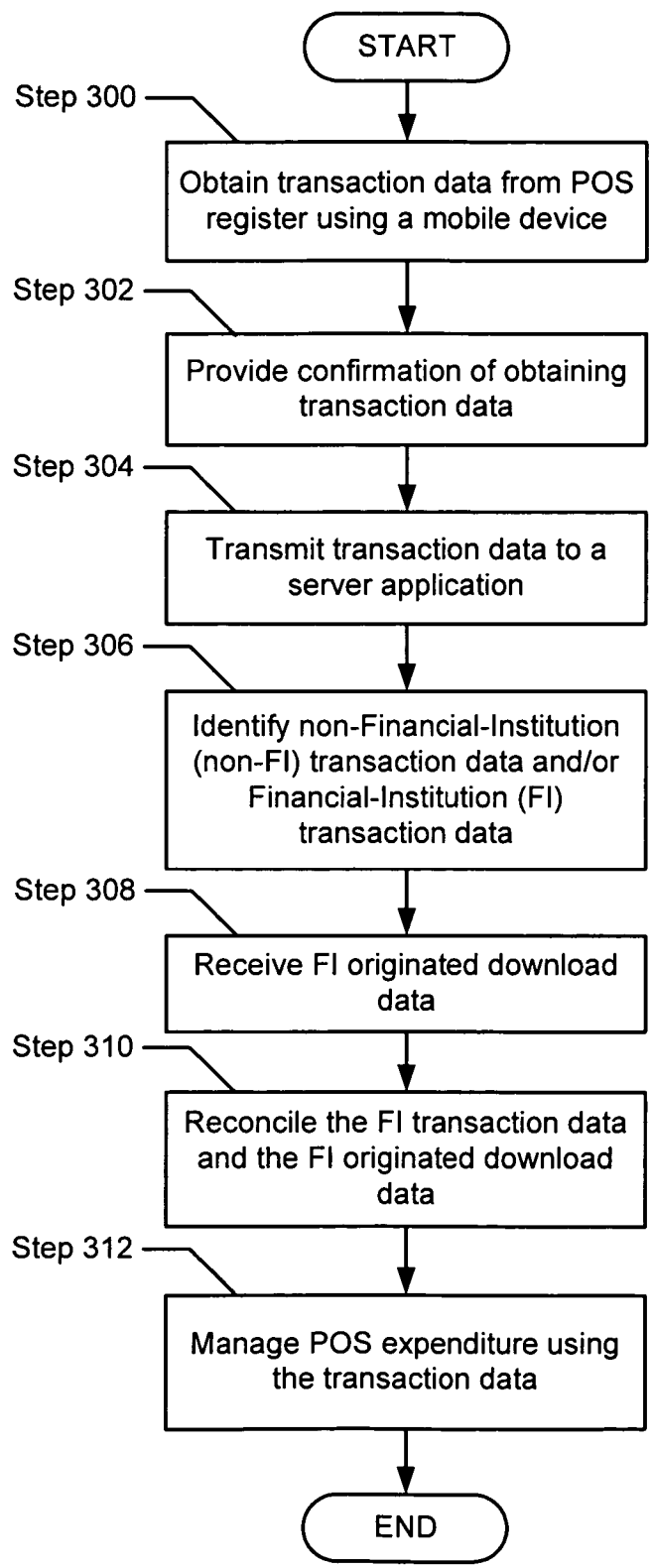

FIG. 3B shows a flow chart of an exemplary method from the user perspective in accordance with one or more embodiments of the invention. The method may be practiced using, for example, the system described with respect to FIG. 1A or 1B above. In one or more embodiments of the invention, one or more of the steps shown in FIG. 3B may be omitted, repeated, and/or performed in a different order than that shown in FIG. 3B. Accordingly, the specific arrangement of steps shown in FIG. 3B should not be construed as limiting the scope of the invention.

In Step 300, transaction data is obtained from an advanced POS register using a mobile device. More specifically, in one or more embodiments of the invention, as a user of the mobile device pays for a transaction at a advanced POS register (e.g., the advanced POS register (101) of FIG. 1A or 1B), the mobile device (e.g., the mobile device (105) of FIG. 1A or 1B) obtains transaction data (e.g., similar to what is used to print paper POS receipts (200a) or (200b) of FIG. 2) from the advanced POS register using various types of signals, connections, and/or protocols described with respect to FIG. 1A or 1B above. In one or more embodiments of the invention, the transaction data obtained from the advanced POS register by the mobile device includes the numeric value of the transaction amount and information regarding the payment type(s) of the transaction.

As described with respect to FIG. 1A or 1B above, in one or more embodiments of the invention, the transmission of the transaction data is unilaterally broadcasted by the advanced POS register, cooperatively performed by the advanced POS register and the mobile device using handshake or bi-directional communication protocol, automatically initiated using auto-run program, or manually activated by a user pushing a button on the mobile device, swiping the mobile device over a designated area of the advanced POS register, or by a user operating the advanced POS register (e.g., a checker at checkout stand or the user at a self-checkout POS register) who pushes a button on the advanced POS register (or by the user at the card swipe terminal).

In Step 302, confirmation is provided to the user and, optionally, to the store employee, upon the transaction data being successfully obtained by the mobile device from the advanced POS register. The confirmation may be in the form of a visual signal (e.g., a flashing light), an audio signal, (e.g., a beep), a vibratory signal (e.g., a momentary vibration), or other sensory signal. In one or more embodiments of the invention, these confirmation signals are manifested on the mobile device. In one or more embodiments of the invention, these confirmation signals are manifested on the advanced POS register, for example upon being notified by the mobile device of the successful transmission of the transaction data.

In one or more embodiments of the invention, the mobile device is a stand-alone device, which obtains the transaction data and performs expenditure tracking and management for the user. In one or more embodiments of the invention, the mobile device includes a simple data collection device and a separate device configured to perform expenditure tracking and management for the user (Step 312).

In one or more embodiments of the invention, the expenditure tracking and management functionality of the mobile device may be supplemented with more extended capabilities not available in the mobile device. In one or more embodiments of the invention, the mobile device is a simple data collection device without expenditure tracking and management functionality. In such embodiments, transaction data is transmitted to a server application or transmitted to a server for download into a desktop software application on the user's home computer, to perform or supplement expenditure tracking and management for or by the user (Step 304). In one or more embodiments of the invention, the mobile device is configured to provide a network connection to enable the mobile device to communicate with a server or with the user's desktop computer (or home- or office-based server) directly. Establishing a connection (e.g., wireless, wired, contact, or contactless connection) between the mobile device to the advanced POS register, in one or more embodiments of the invention, triggers the execution of an auto run program stored on the mobile device. The auto run program initiates the transmission of the transaction data from the advanced POS register and looks for a network connection to connect to the server hosting the server application. When the mobile device is connected to the server, the transaction data is in turn transmitted to the server application on the server (Step 304). When a network connection is unavailable to the mobile device, it stores and queues the transaction for later upload to the server upon achieving a network connection.

In one or more embodiments of the invention, the transaction data includes financial institution (FI) transaction data and/or non-FI transaction data. The FI transaction data relates to a transaction paid by a financial instrument (e.g., a credit card) issued to the user by a financial institution (e.g., the financial institution (115) of FIG. 1A or 1B). The non-FI transaction data relates to transaction paid by cash or cash equivalent. In Step 306, the FI transaction data and/or non-FI transaction data are identified based on information regarding the types of transaction (e.g., payment types (204a) and (204b) of FIG. 2) in the transaction data. In one or more embodiments of the invention, the FI transaction data and/or non-FI transaction data are identified by the mobile device. In one or more embodiments of the invention, the FI transaction data and/or non-FI transaction data are identified by the server application.

As described with respect to FIG. 1A above, FI transaction data is typically transmitted from the POS register to the financial institution, which generates FI paper statements as well as FI-originated download data for the user. In Step 308, FI-originated download data is optionally received by the mobile device or the server application, for example using capability such as open financial exchange (OFX), based on agreement between the FI and the server application provider. In one or more embodiments of the invention, the FI-originated download data is matched and reconciled with the POS transaction data obtained directly from the advanced POS register by the mobile device (Step 310).

As described above, POS-based expenditures are tracked and managed using the POS transaction data obtained by the mobile device from the advanced POS register (Step 312). The expenditure tracking and managing may be performed in the mobile device, the server application, a desktop application, or combination thereof and may optionally include features to reconcile POS transaction data obtained from the advanced POS register with FI-originated download data received from financial institution.

The following examples of embodiments of the invention are not meant to limit the invention in any way. In one or more embodiments of the invention, the advanced POS register may be a product that is controlled and provided by or otherwise associated with an entity such as a financial management service provider. Furthermore, the entity may be a company or organization responsible for marketing, selling, or distributing the mobile device or an optional add-on feature/module of the mobile device that delivers the functionalities described above to customers and/or vendors. In addition to supporting the transaction data transmission capability of the advanced POS register and the receiving capability of the mobile device, the financial management service provider may operate the server and associated server application to provide an end-to-end expenditure tracking and financial management solution. Furthermore, smart personal objects with transaction data collection capability may be provided by the financial management service provider to merchants or financial institutions in multi-lateral marketing activities for promoting attractive offerings to customers where the end-to-end expenditure tracking and financial management solution may be offered for free or at a discounted price as part of the attraction or in order to deliver advertising or promotional discounts or offers to the user via the mobile device.

In one or more embodiments of the invention, authentication—to prevent other people (who, for example, are standing behind the user in the checkout line) from receiving the user's transaction—is based on: (a) the fact that the debit or credit transaction and the corresponding transaction data bears the last four or five digits of card-based account number of the user's own particular debit or credit card, and (b) those digits match only against accounts in the software present on mobile devices where the account attributes have the same four or five numbers and match the credit card type. The chances of any two people in a retail store checkout line having the same last four or five digits for accounts of the same card type stored in each of their respective mobile devices are less than 1 in 10,000, so the occurrence of any erroneous receipt of another shopper's transaction data at the checkout counter will be extremely low. If such erroneous receipt does ever occur, the user will see extra transactions when later reviewing transactions on the mobile device or at home on the server or desktop application, and will be able to reject the one with the item detail or amount that he/she does not recognize.

In one or more embodiments of the invention, the mobile device receives transactions into the correct account within the software on the mobile device by detecting the last four or five digits of the debit or credit card number to match the user's financial account attributes in the software on the mobile device if the debit or credit card is used for the transaction.

In one or more embodiments of the invention, in the case of a cash transaction or a card-based transaction where the user wishes additional authentication, the user can enter, on a simple keypad attached to the advanced POS register, a unique personal identification number (PIN), at the time of payment. That PIN is then attached to the transaction record and beamed to the user's mobile device where the user has set up the financial management software (or thin-client transaction-receiving software) to accept only transactions bearing that particular PIN. The user may optionally decide to adopt different PINs for different retailers. In one or more embodiments of the invention, the PIN may be a four digit code.

In one or more embodiments of the invention, the mobile device receives transactions into a cash account within the software on the mobile device by detecting a unique cash indicator from transactions received from the advanced POS register where this unique cash indicator may be a user-defined code entered into the advanced POS register by, e.g., a store employee, and embedded in the transaction record when the purchase is paid with cash.

In one or more embodiments of the invention, the transaction data is transmitted securely to a server (e.g., as described with respect to Step 304 above) where the transaction data may be similarly matched against the user's accounts and queued for the user to accept or reject when the user later accesses the financial software, either on a mobile device, a PC, or through a web-based subscription service. The user may then accept or reject the transaction data based on whether the transaction data does belong to the user or whether the data is matched against or received into the correct account in the financial software.

In one or more embodiments of the invention, the mobile device synchronizes and combines both FI-originated download data (obtained through established means such as OFX) with real-time transaction information received from the advanced POS register to provide the user with a "Real-Time Balance" of how much money is truly available to the user to spend and/or how much has been spent against a given budget or category. In one or more embodiments of the invention, each time a POS transaction is completed using cash payment, cash-equivalent enabled payment, debit/credit payment, etc., a real-time balance of the corresponding account associated with each of these payment types used may be generated and presented to the user. For example, the real-time balance and a general budget status may be displayed using the mobile device for any of the accounts used for payment of the POS transaction, such as cash account, debit/credit card account, etc. The general budget status reflects a progress of the budget including comparison of cumulative spending against preset budget. In one or more embodiments of the invention, an alert may be generated if the real-time balance is within a predetermined limit of the general budget set up for the respective account or category of spending, or an alert may be generated if a particular account is close to being over-drawn or below its FI-mandated account balance limit for avoidance of minimum balance fees. Because debit and credit transactions normally take days for the FI to receive, reconcile, process and provide to the user through FI-originated download data, the combination of posted FI transaction data with as-yet unposted real-time transaction data from the point of sale (e.g., the advanced POS register) provides the user a real-time view of the user's true, current financial situation, which view has not previously been available before.

In one or more embodiments of the invention, the user can "match" debit or credit card transactions received from the advanced POS register against the same transactions received days later from the FI through the normal means (e.g., paper statements or download data). This allows the user to double check amounts billed or withdrawn as the financial management software installed on the mobile device, the server or the user's desktop computer is able to match and reconcile the advanced POS register transaction with the same transaction as received from the financial institution.

In one or more embodiments of the invention, the transaction data received from the advanced POS register includes meta data, such as so-called second-level data regarding the transaction. The meta data may include itemized information such as indication of purchase or return, item names or descriptions as they appear on the paper receipt, universal product code (UPC) information, itemized prices, tax-related entries or amounts associated with each item or with the total transaction, and other information such as sale mark-down, merchant name, store address, transaction date and time, item description and other item-level information, The financial management software installed on the mobile device, the server or the user's personal computer uses such imported metadata and allows the user to search and review item-level purchase information and behavioral trends, for example in common list and/or report formats. More details of tracking item-level purchase information may be found in U.S. patent application Ser. No. 11/833,206 entitled "METHOD AND SYSTEM FOR AUTOMATIC RECOGNITION AND CATEGORIZATION OF TRANSACTIONS" and U.S. patent application Ser. No. 12/130,975 entitled "METHOD AND SYSTEM FOR TRACKING PURCHASES." Generally speaking, over time, this capability gives the user the ability to measure any increases or decreases in purchase behavior regarding particular items, as well as changes in the prices of regularly purchased individual items (e.g., a pint of milk or 20-ounce loaf of whole-wheat bread, etc.) and provides a personalized means of measuring price trends such as inflation and the rate of inflation based on actual household expenditures over time.

In one or more embodiments of the invention, portions of expenditure within a single POS transaction captured by the mobile device may be categorized into different categories by the software using the aforementioned item-level purchase information for the purpose of tracking expenditures to a budget based on pre-determined categories. In one or more embodiments of the invention, the POS expenditure is categorized by type or by budget category (e.g., dining out) in real-time as the POS transaction is completed and accepted into the mobile device, allowing the user to maintain per-category cumulative expenditure records, which may be displayed with corresponding preset category budgets for spending in each of the respective categories or progress of the corresponding category budgets.

In one or more embodiments of the invention, a certain item may be marked as a watch item in the mobile device such that an alert may be generated when such item is detected in the transaction data received from the advanced POS register with an associated item purchase price within a pre-determined price range indicating a in-stock status and/or a sales promotion. Such alert may prompt the user to make additional purchases or may be sent to the user's social network informing others of the in-stock and/or sales promotion status.

In one or more embodiments of the invention, functionalities described above may be duplicated in a web browser during an online purchase, triggering the financial management software to send transaction data to a holding area maintained by the financial management service provider for the customer to retrieve later, if desired.

Figure 4:
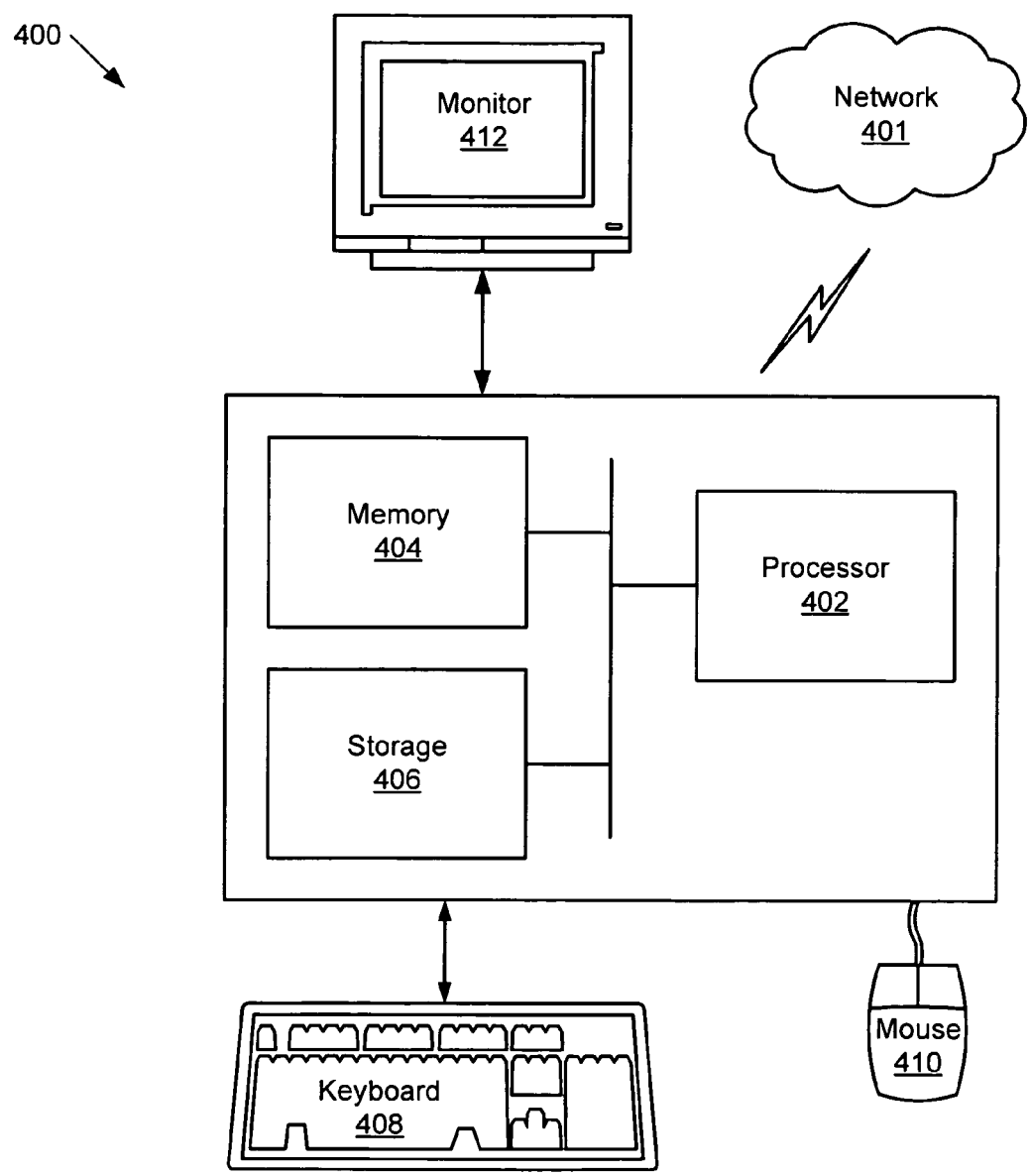
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (508) and a mouse (410), and output means, such as a monitor (412).

The computer system (400) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g. the server application, the computing device, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for capturing and tracking a transaction corresponding to a purchase of a product by a user at a Point-of-Sale (POS) register, comprising:
    calculating an initial balance of a financial account of the user;
    sending, by the POS register and after calculating the initial balance, a transaction data item corresponding to the transaction to a mobile device of the user after the product is purchased,
        wherein the transaction data item comprises a transaction debit amount and a transaction payment type indicating check payment,
        wherein the transaction comprises paying for the purchase using a check to debit the transaction debit amount from the financial account, and
        wherein the product and the mobile device are separate from the financial account;
    receiving, by a server application, the transaction data item from the mobile device;
    calculating a first real-time balance of the financial account based the initial balance and the transaction debit amount; and
    presenting the first real-time balance of the financial account to the user.

2. The method of claim 1, wherein presenting the first real-time balance of the financial account comprises displaying the first real-time balance of the financial account and a progress of a budget associated with at least one selected from a group consisting of the financial account and a spending category of the financial account.

3. The method of claim 1, wherein presenting the first real-time balance of the financial account comprises generating an alert when the first real-time balance of the financial account is within a pre-determined limit of a budget associated with at least one selected from a group consisting of the financial account and a spending category of the financial account.

4. The method of claim 1, wherein the transaction data item further comprises a plurality of item-level information, and the method further comprises:
  categorizing the item-level information for maintaining a plurality of per-category cumulative expenditure records based on the plurality of item-level information,
  wherein presenting the first real-time balance of the financial account comprises displaying the plurality of per-category cumulative expenditure records and corresponding progress of per-category budgets.

5. The method of claim 1, wherein the first real-time balance of the financial account is calculated by a local application of the mobile device prior to receiving the transaction data item by the server application.

6. The method of claim 1, further comprising:
  receiving, after receiving the transaction data item from the mobile device, a Financial-Institution (FI) transaction data item corresponding to the transaction from a financial institution processing a check used in the transaction; and
  matching, based on the check payment type and the transaction debit amount, the transaction data item to the FI transaction data item.

7. The method of claim 6, wherein the first real-time balance is calculated prior to receiving the FI transaction data item.

8. The method of claim 1, wherein the transaction data item is sent to the mobile device by a wireless transmitter of the POS register.

9. The method of claim 1, further comprising:
  receiving a request to include the transaction data item in the financial account.

10. The method of claim 1, further comprising:
  receiving, by the server application, a request from the mobile device to exclude the transaction data item from the financial account; and
  calculating, after receiving the request, a second real-time balance of the financial account excluding the transaction debit amount.

11. A method for capturing and tracking a transaction corresponding to a purchase of a product by a user at a Point-of-Sale (POS) register, comprising:
  calculating an initial balance of a financial account of the user;
  sending, by the POS register and after calculating the initial balance, a transaction data item corresponding to the transaction to a mobile device of the user after the product is purchased,
    wherein the transaction data item comprises a transaction debit amount and a transaction payment type indicating cash payment,
    wherein the transaction comprises paying for the purchase using cash to debit the transaction debit amount from the financial account, and
    wherein the product and the mobile device are separate from the financial account;
  receiving, by a server application, the transaction data item from the mobile device;
  calculating a first real-time balance of the financial account based the initial balance and the transaction debit amount; and
  presenting the first real-time balance of the financial account to the user.

12. The method of claim 11, wherein the transaction data item is sent to the mobile device by a wireless transmitter of the POS register.

13. The method of claim 11, wherein the first real-time balance of the financial account is calculated by a local application of the mobile device prior to receiving the transaction data item by the server application.

14. The method of claim 11, further comprising:
  receiving a request to include the transaction data item in the financial account.

15. The method of claim 11, further comprising:
  receiving, by the server application, a request from the mobile device to exclude the transaction data item from the financial account; and
  calculating, after receiving the request, a second real-time balance of the financial account excluding the transaction debit amount.

16. A computer readable medium, storing a plurality of instructions for capturing and tracking a transaction corresponding to a purchase of a product by a user at a Point-of-Sale (POS) register, the plurality of instructions comprising functionality to:
  calculate, by a server application, an initial balance of a financial account of the user;
  send, by the POS register and after calculating the initial balance, a transaction data item corresponding to the transaction to a mobile device of the user after the product has been purchased,
    wherein the transaction data item comprises a transaction debit amount and a transaction payment type indicating check payment,
    wherein the transaction comprises paying for the purchase using a check to debit the transaction debit amount from the financial account, and
    wherein the product and the mobile device are separate from the financial account;
  receive, by the server application, the transaction data item from the mobile device;
  calculate a first real-time balance of the financial account based on the initial balance and the transaction debit amount; and
  present the first real-time balance of the financial account to the user.

17. The computer readable medium of claim 16, the plurality of instructions further comprising functionality to:
  receive, after receiving the transaction data item from the mobile device, a Financial-Institution (FI) transaction data item corresponding to the transaction from a financial institution processing a check used in the transaction; and
  match, based on the check payment type and the transaction debit amount, the transaction data item to the FI transaction data item.

18. The computer readable medium of claim 17, wherein the first real-time balance is calculated prior to receiving the FI transaction data item.

19. The computer readable medium of claim 16, wherein the transaction data item is sent to the mobile device by a wireless transmitter of the POS register.

20. The computer readable medium of claim 16, wherein the first real-time balance of the financial account is calculated by the mobile device prior to receiving the transaction data item by the server application.

21. The computer readable medium of claim 16, the plurality of instructions further comprising functionality to:
  receive a request to include the transaction data item in the financial account.

22. The computer readable medium of claim 16, the plurality of instructions further comprising functionality to:

receiving, by the server application, a request from the mobile device to exclude the transaction data item from the financial account; and calculating, after receiving the request, a second real-time balance of the financial account excluding the transaction debit amount.

23. A Point-of-Sale (POS) transaction tracking system for capturing and tracking a transaction corresponding to a purchase of a product by a user, comprising:

a server application comprising functionality to:
calculate an initial balance of a financial account of the user,
receive a transaction data item corresponding to the transaction from a mobile device of the user, wherein the transaction data item comprises a transaction debit amount and a transaction payment type indicating check payment,
calculate a first real-time balance of the financial account based on the initial balance and the transaction debit amount, and
present the first real-time balance of the financial account to the user; and a POS register comprising a wireless transmitter, the wireless transmitter comprising functionality to:
send, after calculating the initial balance and after the product has been purchased, the transaction data item to the mobile device;

wherein the transaction comprises paying for the purchase using a check to debit the transaction debit amount from the financial account, and wherein the product and the mobile device are separate from the financial account.

24. The POS transaction tracking system of claim 23,
wherein presenting the first real-time balance of the financial account comprises displaying the first real-time balance and a progress of a budget associated with at least one selected from a group consisting of the financial account and a spending category of the financial account.

25. The POS transaction tracking system of claim 23,
wherein presenting the first real-time balance of the financial account comprises generating an alert when the first real-time balance is within a pre-determined limit of a general budget associated with at least one selected from a group consisting of the financial account and a spending category of the financial account.

26. The POS transaction tracking system of claim 23, wherein the transaction data item further comprises a plurality of item-level information, and wherein the server application further comprises functionality to:
categorize the plurality of item-level information for maintaining a plurality of per-category cumulative expenditure records based on the plurality of item-level information, and
display the plurality of per-category cumulative expenditure records and corresponding progress of per-category budgets.

27. The POS transaction tracking system of claim 23, wherein the POS register is configured to provide confirmation of the transaction data item being received by the mobile device.

28. The system of claim 23, wherein the server application further comprises functionality to:
receive, after receiving the transaction data item from the mobile device, a Financial-Institution (FI) transaction data item corresponding to the transaction from a financial institution processing a check used in the transaction; and
match, based on the check payment type and the transaction debit amount, the transaction data item to the FI transaction data item.

29. The system of claim 28, wherein the first real-time balance is calculated prior to receiving the FI transaction data item.

30. The system of claim 23, wherein the first real-time balance of the financial account is calculated prior to receiving the transaction data item by the server application.

31. The system of claim 23, wherein the server application further comprises functionality to:
receive a request from the mobile device to exclude the transaction data item from the financial account; and
calculate, after receiving the request, a second real-time balance of the financial account excluding the transaction debit amount.

* * * * *